United States Patent
Falk et al.

(10) Patent No.: US 8,888,451 B2
(45) Date of Patent: Nov. 18, 2014

(54) METHOD FOR PRODUCING A VANE, SUCH A VANE AND A STATOR COMPONENT COMPRISING THE VANE

(75) Inventors: Lisa Falk, Trollhättan (SE); Elin Skoglund, Trollhättan (SE)

(73) Assignee: Volvo Aero Corporation, Trollhättan (SE)

( * ) Notice: Subject to any disclaimer, the term of this patent is extended or adjusted under 35 U.S.C. 154(b) by 1226 days.

(21) Appl. No.: 12/682,595

(22) PCT Filed: Oct. 11, 2007

(86) PCT No.: PCT/SE2007/000897
§ 371 (c)(1),
(2), (4) Date: Apr. 21, 2010

(87) PCT Pub. No.: WO2009/048357
PCT Pub. Date: Apr. 16, 2009

(65) Prior Publication Data
US 2011/0164969 A1     Jul. 7, 2011

(51) Int. Cl.
*F01D 9/02* (2006.01)
*B23P 15/04* (2006.01)
*F01D 9/04* (2006.01)

(52) U.S. Cl.
CPC ............ *B23P 15/04* (2013.01); *Y02T 50/673* (2013.01); *F05D 2230/21* (2013.01); *F01D 9/042* (2013.01)
USPC ..................................... 415/209.3; 415/209.4

(58) Field of Classification Search
CPC .................... F05D 2240/121; F05D 2240/122
USPC ............. 415/182.1, 191, 208.1, 208.2, 209.3, 415/209.4, 210.1
See application file for complete search history.

(56) References Cited

U.S. PATENT DOCUMENTS

| | | | |
|---|---|---|---|
| 3,294,366 A | | 12/1966 | Coplin |
| 3,466,725 A | | 9/1969 | Kock |
| 3,619,077 A | * | 11/1971 | Wile et al. ............. 415/115 |
| 5,314,301 A | * | 5/1994 | Knight .................. 415/160 |
| 5,370,171 A | * | 12/1994 | Fields et al. ............ 164/312 |
| 5,605,440 A | * | 2/1997 | Bocoviz et al. .......... 415/200 |
| 6,070,643 A | * | 6/2000 | Colvin .................... 164/61 |
| 6,070,644 A | * | 6/2000 | Grumm et al. ........... 164/66.1 |

(Continued)

FOREIGN PATENT DOCUMENTS

| | | |
|---|---|---|
| EP | 1561830 A1 | 8/2005 |
| GB | 1218021 A | 1/1971 |

(Continued)

OTHER PUBLICATIONS

Supplementary European Search Report for corresponding European App. EP 07 83 5099, Mar. 2011.

(Continued)

*Primary Examiner* — Edward Look
*Assistant Examiner* — Christopher R Legendre
(74) *Attorney, Agent, or Firm* — WRB-IP LLP

(57) ABSTRACT

A method for producing a vane for application in a component in a gas turbine engine includes casting at least one of a vane leading edge part and a vane trailing edge part and connecting the leading edge part and the trailing edge part.

19 Claims, 5 Drawing Sheets

(56) References Cited

U.S. PATENT DOCUMENTS

| | | | |
|---|---|---|---|
| 6,200,092 B1* | 3/2001 | Koschier | 415/191 |
| 6,325,593 B1* | 12/2001 | Darkins et al. | 415/115 |
| 7,258,530 B2* | 8/2007 | Morrison et al. | 416/232 |
| 7,452,182 B2* | 11/2008 | Vance et al. | 415/135 |
| 7,887,300 B2* | 2/2011 | Mazzola et al. | 416/241 B |
| 8,292,580 B2* | 10/2012 | Schiavo et al. | 416/96 A |
| 8,303,246 B2* | 11/2012 | Drelon et al. | 415/142 |
| 2006/0228211 A1* | 10/2006 | Vance et al. | 415/200 |
| 2009/0252612 A1* | 10/2009 | Ahmad et al. | 416/241 A |
| 2010/0150707 A1* | 6/2010 | Jevons | 415/200 |
| 2011/0164969 A1* | 7/2011 | Falk et al. | 415/208.1 |
| 2012/0171028 A1* | 7/2012 | Tudor et al. | 415/208.1 |
| 2013/0064661 A1* | 3/2013 | Evans et al. | 415/208.1 |

FOREIGN PATENT DOCUMENTS

| | | | | |
|---|---|---|---|---|
| GB | 1247431 A | | 9/1971 | |
| GB | 2012372 A | | 7/1979 | |
| GB | 2030233 A | | 4/1980 | |
| GB | 2061398 A | | 5/1981 | |
| JP | 07180504 A | * | 7/1995 | F01D 9/02 |

OTHER PUBLICATIONS

International Search Report for corresponding International Application PCT/SE2007/000897, Aug. 2008.

International Preliminary Report on Patentability for corresponding International Application PCT/SE2007/000897, Aug. 2009.

* cited by examiner

METHOD FOR PRODUCING A VANE, SUCH A VANE AND A STATOR COMPONENT COMPRISING THE VANE

BACKGROUND AND SUMMARY

The present invention relates to method for producing a vane for application in a component in a gas turbine engine, especially a jet engine. The vane is especially suited for application in a stator component and primarily in an intermediate case (IMC) in an aircraft engine of the turbofan type. The invention is further directed to such a vane per se and a stator component (IMC) comprising the vane.

An aircraft gas turbine engine of the turbofan type generally comprises a forward fan and booster compressor, a middle core engine, and an aft low pressure power turbine. The core engine comprises a high pressure compressor, a combustor and a high pressure turbine in a serial relationship. The high pressure compressor and high pressure turbine of the core engine are interconnected by a high pressure shaft. The high-pressure compressor, turbine and shaft essentially form a high pressure rotor. The high-pressure compressor is rotationally driven to compress air entering the core engine to a relatively high pressure. This high pressure air is then mixed with fuel in the combustor and ignited to form a high energy gas stream. The gas stream flows aft and passes through the high-pressure turbine, rotationally driving it and the high pressure shaft which, in turn, rotationally drives the high pressure compressor.

The gas stream leaving the high pressure turbine is expanded through a second or low pressure turbine. The low pressure turbine rotationally drives the fan and booster compressor via a low pressure shaft, all of which form the low pressure rotor. The low pressure shaft extends through the high pressure rotor. Most of the thrust produced is generated by the fan.

Part of the incoming air flow to the aircraft engine enters an inner, primary gas duct, which guides the air to the combustor, and part of the incoming air flow enters an outer, secondary gas duct (fan duct) in which the engine bypass air flows.

The intermediate case (IMC) is a non-rotating component and forms a load-carrying structure. In a commercial, 2-shaft turbofan engine, the intermediate case is located between the Low Pressure Compressor and the High Pressure Compressor in the engine axial direction. At this location, the operating temperature is considered to be relatively low compared to the components downstream of the combustion chamber and is therefore referred to as a cold structure.

The intermediate case comprises a core structure, which comprises the primary gas duct, and a by-pass structure, which comprises the fan duct. The present invention is especially suited for the by-pass structure. The by-pass structure comprises an inner ring, an outer ring and a plurality of circumferentially spaced vanes arranged between the inner ring and the outer ring, wherein gas flow channels are formed between the adjacent vanes. The circumferentially spaced vanes are often called Outlet Guide Vanes (OGV).

The intermediate case has a number of various functions. The engine mount, i.e the connection between the engine and the aircraft, is placed on the outside of the IMC. The IMC is thereby exposed to high loads. The IMC is also a support for the bearings on the low pressure shaft and the high pressure rotor. Transmission of power between gearboxes may also be led through the intermediate case.

The vanes form structural vanes, i.e load-carrying struts. The vanes may also have aerodynamic characteristics, wherein they are designed to redirect a swirling flow from the upstream fan. Such a vane is usually denoted an integrated OGV in this application.

It is desirable to achieve a cost-efficient method for producing a vane, which results in a vane with low weight. The method should further be suited for producing a vane for an intermediate case in a turbofan engine.

A method according to an aspect of the present invention includes the steps of casting at least one of a vane leading edge part and a vane trailing edge part, and connecting the leading edge part and the trailing edge part. It has turned out that casting gives a sufficient dimensional accuracy and surface roughness for application as an edge part in a vane in an intermediate case. Especially, it creates conditions for reaching a final shape without any subsequent machining.

According to a preferred embodiment, the method comprises the step of forming the cast edge part by means of a vacuum high pressure die casting method. In this way, a low porosity is achieved, which increases the material properties and the weld ability. Further, the ductility and ultimate tensile strength is sufficiently high.

A method according to another aspect of the present invention includes the steps of forming at least one of a vane leading edge part and a vane trailing edge part with a means for attaching the vane to an external structure on opposite sides of the edge part in a longitudinal direction of the vane, forming the edge part so that it is adapted to be load carrying in a longitudinal direction of the vane and forming the vane by connecting said edge parts. Thus, each of the edge parts forms a load-carrying structure comprising the attachment means. Thus, the attachment means is integrated in the edge part, which simplifies transfer of forces between the vane and the adjacent components. Further, this design creates further conditions for a more cost-efficient production in that the different parts can be produced separately and then assembled.

According to a preferred embodiment, the method comprises the step of casting each of the leading edge part and the trailing edge part in one piece. The method further preferably comprises the step of attaching the leading edge part and the trailing edge part on opposite sides of an intermediate vane part. Thus, the final vane is assembled from three parts. The intermediate vane part is preferably formed by two plate-shaped portions at a distance from each other, which portions define opposite external surfaces of the vane. Further, the method preferably comprises the step of connecting at least one of the leading edge part and the trailing edge part to the intermediate vane part via welding.

It is also desirable to achieve a vane, which is low weight and cost-efficient in production. The vane should further be suited for application in an intermediate case in a turbofan engine.

Other advantageous embodiments of the invention and its associated advantages are apparent from the following description.

BRIEF DESCRIPTION OF THE DRAWINGS

The invention will be explained below, with reference to the embodiments shown on the appended drawings, wherein.

DETAILED DESCRIPTION

Figure 1:
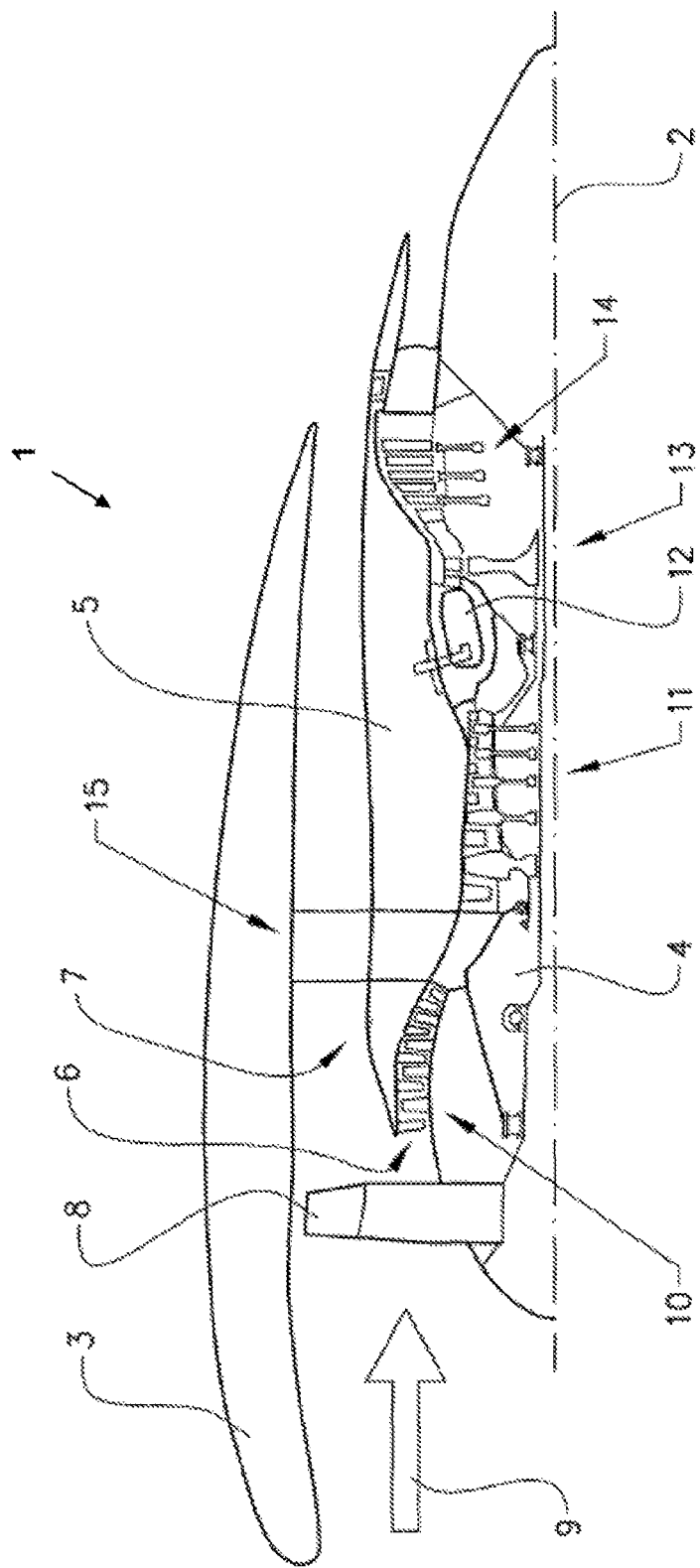
FIG. 1 is a schematic longitudinal sectional view illustration of an exemplary embodiment of an aircraft turbofan gas turbine engine.

The invention will below be described for a turbofan gas turbine aircraft engine 1, which in FIG. 1 is circumscribed about an engine longitudinal central axis 2. The engine 1 comprises an outer casing or nacelle 3, an inner casing 4 (rotor) and an intermediate casing 5 which is concentric to the first two casings and divides the gap between them into an inner primary gas channel 6 for the compression of air and a secondary channel 7 in which the engine bypass air flows. Thus, each of the gas channels 6,7 is annular in a cross section perpendicular to the engine longitudinal central axis 2.

The engine 1 comprises a fan 8 which receives ambient air 9, a booster or low pressure compressor (LPC) 10 and a high pressure compressor (HPC) 11 arranged in the primary gas channel 6, a combustor 12 which mixes fuel with the air pressurized by the high pressure compressor 11 for generating combustion gases which flow downstream through a high pressure turbine (HPT) 13 and a low pressure turbine (LPT) 14 from which the combustion gases are discharged from the engine.

A first or high pressure shaft joins the high pressure turbine 13 to the high pressure compressor 11 to substantially form a first or high pressure rotor. A second or low pressure shaft joins the low pressure turbine 14 to the low pressure compressor 10 to substantially form a second or low pressure rotor. The high pressure compressor 11, combustor 12 and high pressure turbine 13 are collectively referred to as a core engine. The second or low pressure shaft is at least in part rotatably disposed co-axially with and radially inwardly of the first or high pressure rotor.

The engine 1 comprises an intermediate case (IMC) 15. The intermediate case 15 is located between the Low Pressure Compressor 10 and the High Pressure Compressor 11 in the engine axial direction. The intermediate case 15 comprises a core structure, which comprises the primary gas duct 6, and a by-pass structure, which comprises the fan duct 7. The engine 1 is mounted to an aircraft via the IMC such as by a pylon (not illustrated), which extends downwardly from an aircraft wing.

Figure 3:
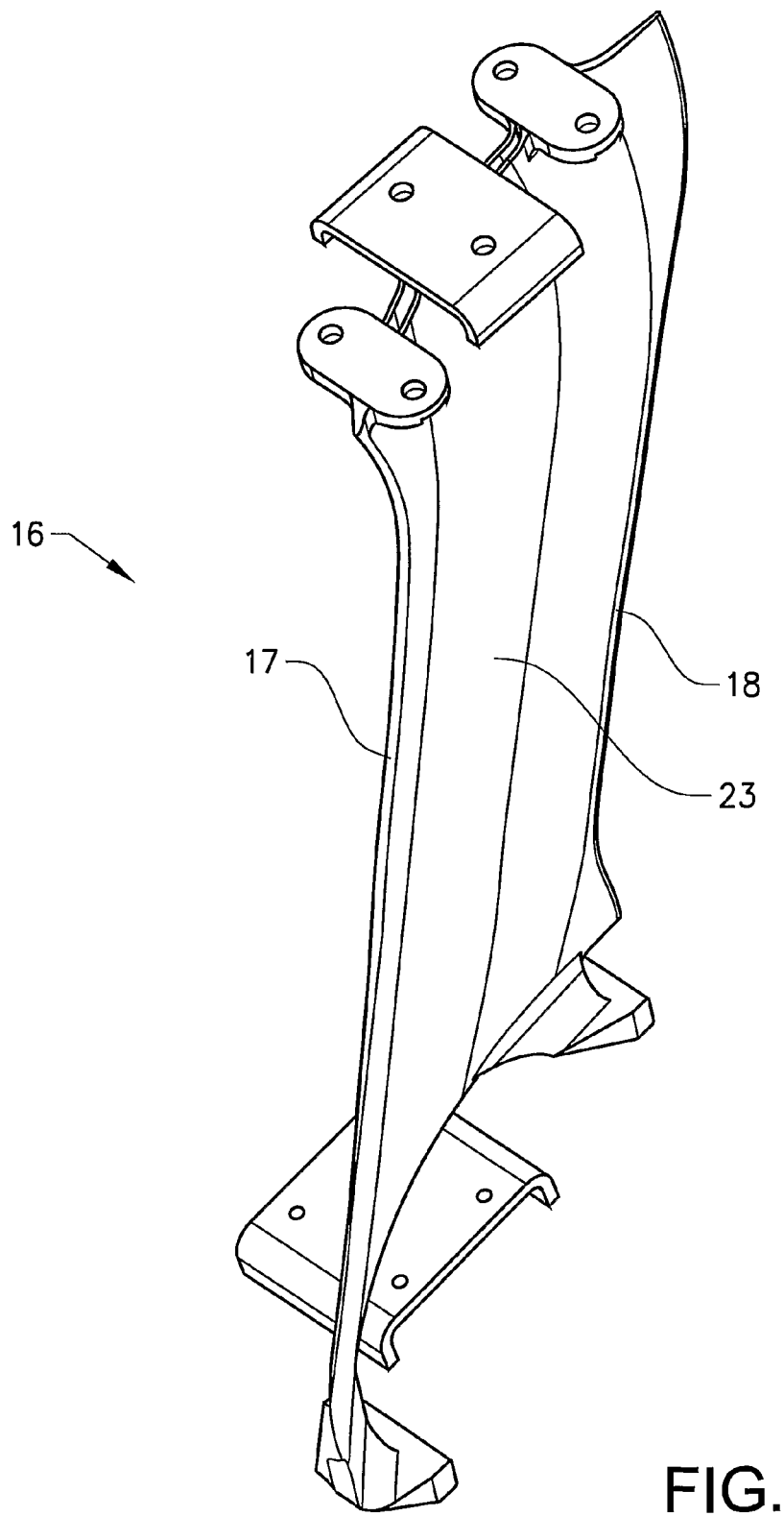
FIG. 3 shows the vane in FIG. 2 in a perspective front view.
Figure 4:
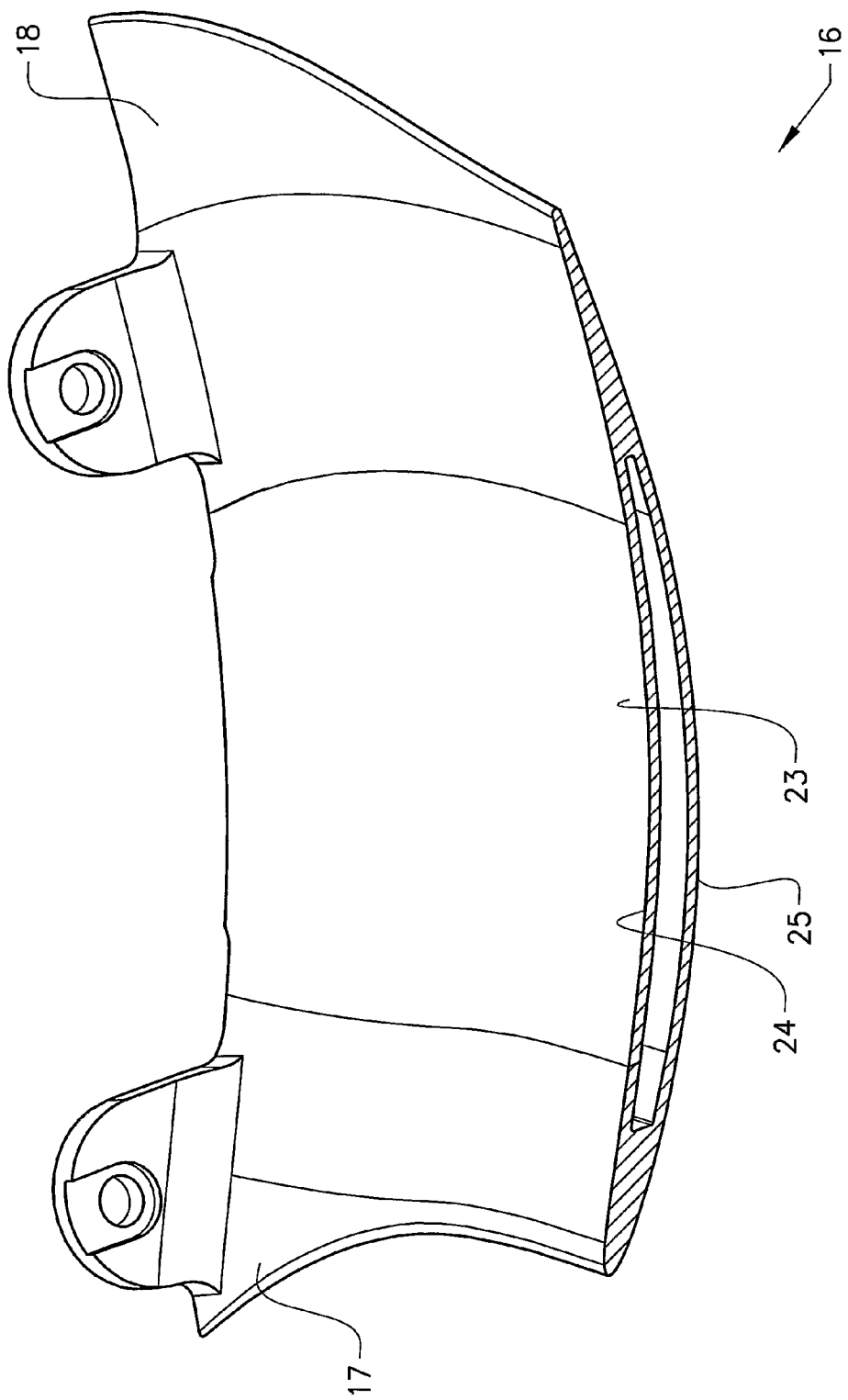
FIG. 4 shows a cross section of the vane in FIG. 2.

The by-pass structure comprises an inner ring, an outer ring and a plurality of circumferentially spaced vanes arranged between the inner ring and the outer ring, wherein gas flow channels are formed between the adjacent vanes. The production and design of these vanes will be described below with reference to FIGS. 2-4.

Figure 2:
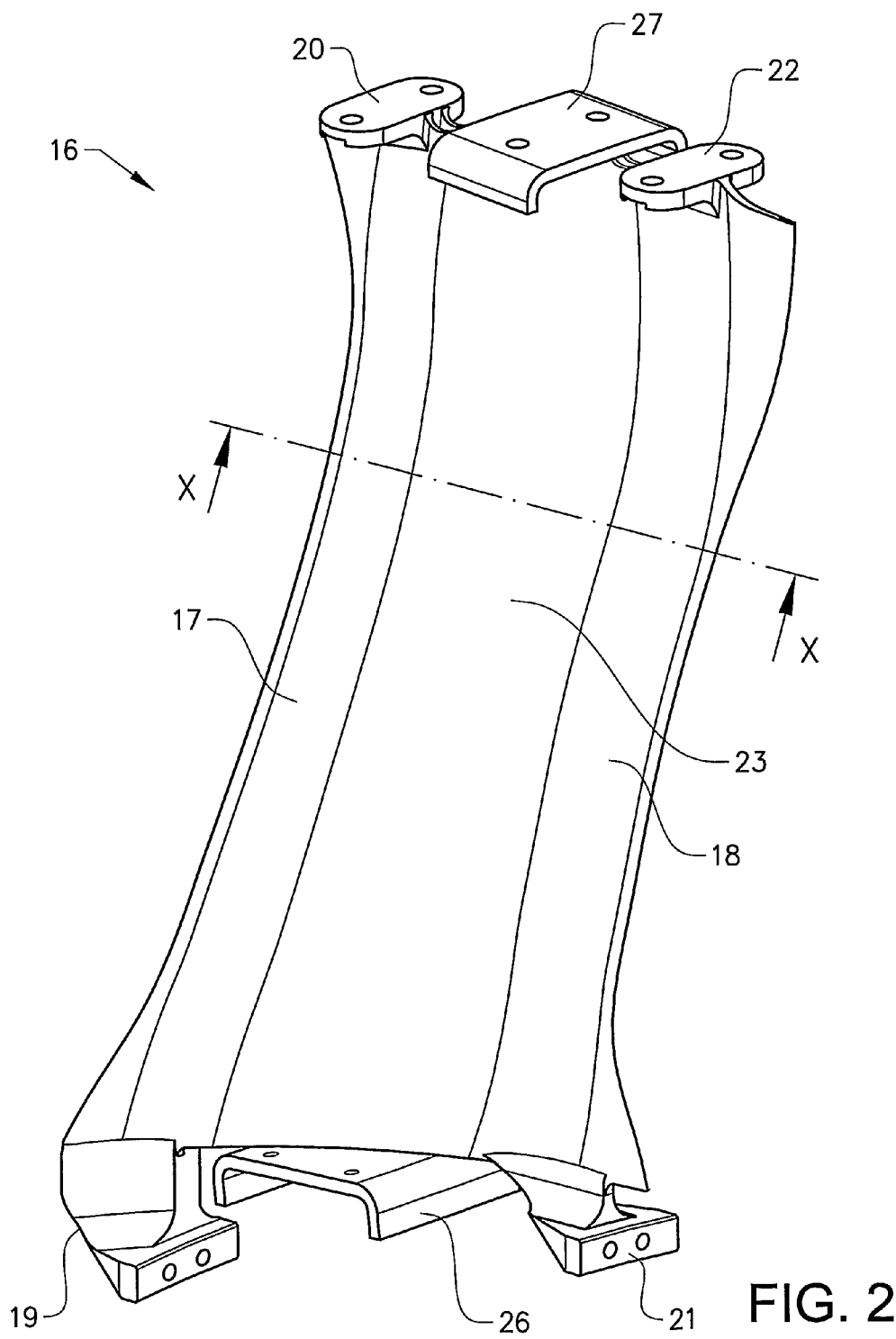
FIG. 2 shows a vane in a perspective side view.

A vane 16 is shown in a perspective view in FIG. 2. The vane 16 has the shape of an air foil. The vane comprises a leading edge part 17 and a trailing edge part 18. Each of the edge parts 17,18 extends along the complete longitudinal edge of the vane 16. Each of the edge parts 17,18 is adapted to be load carrying in said longitudinal direction of the vane 16.

Each edge part 17,18 comprises an attachment means 19,20,21,22 for attaching the vane to an external structure at each end in the longitudinal direction. The inner attachment means 19,21 form core attachments. The outer attachment means 20,22 form case attachments. Each of the attachment means 19,20,21,22 is adapted for a bolted connection. It therefore comprises a projecting portion with bolt holes.

The vane 16 further comprises an intermediate vane part 23 arranged between the leading edge part 17 and the trailing edge part 18. The intermediate vane part 23 comprises two plate-shaped portions 24,25 (see FIG. 4) arranged at a distance from each other, which define external surfaces of the vane 16. Each of the plate-shaped portions 24,25 is formed by a metal sheet. The intermediate part is preferably hollow. It may comprise a sandwich structure. According to an alternative, the interior of the vane may be filled with a foam, preferably a plastic foam. According to a further alternative, a more rigid structure, or frame, such as a honeycomb structure, may be positioned inside the vane.

Further, the intermediate vane part 23 comprises a stiffening plate 26,27 at each end in the longitudinal direction of the vane 16, extending at right angles to the vane. The stiffening plate 26,27 is adapted for a bolted connection and comprises bolt holes.

The edge parts 17,18 are preferably connected to the intermediate vane part 23 via weld connections.

A method for producing the vane 16 will now be described. It comprises the steps of individually casting the vane leading edge part 17 and the vane trailing edge part 18. Thus, each of the leading edge part 17 and the trailing edge part 18 is cast in one piece. A vacuum high pressure die casting method is preferably used. In high pressure die casting, a charge is injected in the die at high speed (about 40 m/s) into a tool. The metal solidifies while being subjected to a pressure from an injection piston.

The method comprises the step of casting the edge part 17,18 with such a shape that it extends along the complete longitudinal edge of the vane 16. Further, it comprises the step of casting the edge part 17,18 so that it is adapted to be load carrying in the longitudinal direction of the vane 16. Said attachment means 19,20,21,22 is cast in one piece with the respective edge part 17,18.

The cast part 17,18 is preferably formed by a lightweight metal material, such as aluminium or titanium.

Further, the method comprises the step of providing the intermediate vane part 23 and attaching the leading edge part 17 and the trailing edge part 18 on opposite sides of the intermediate vane part 23. The leading edge part 17 and the trailing edge part are preferably connected to the intermediate vane part 23 via welding.

Figure 5:
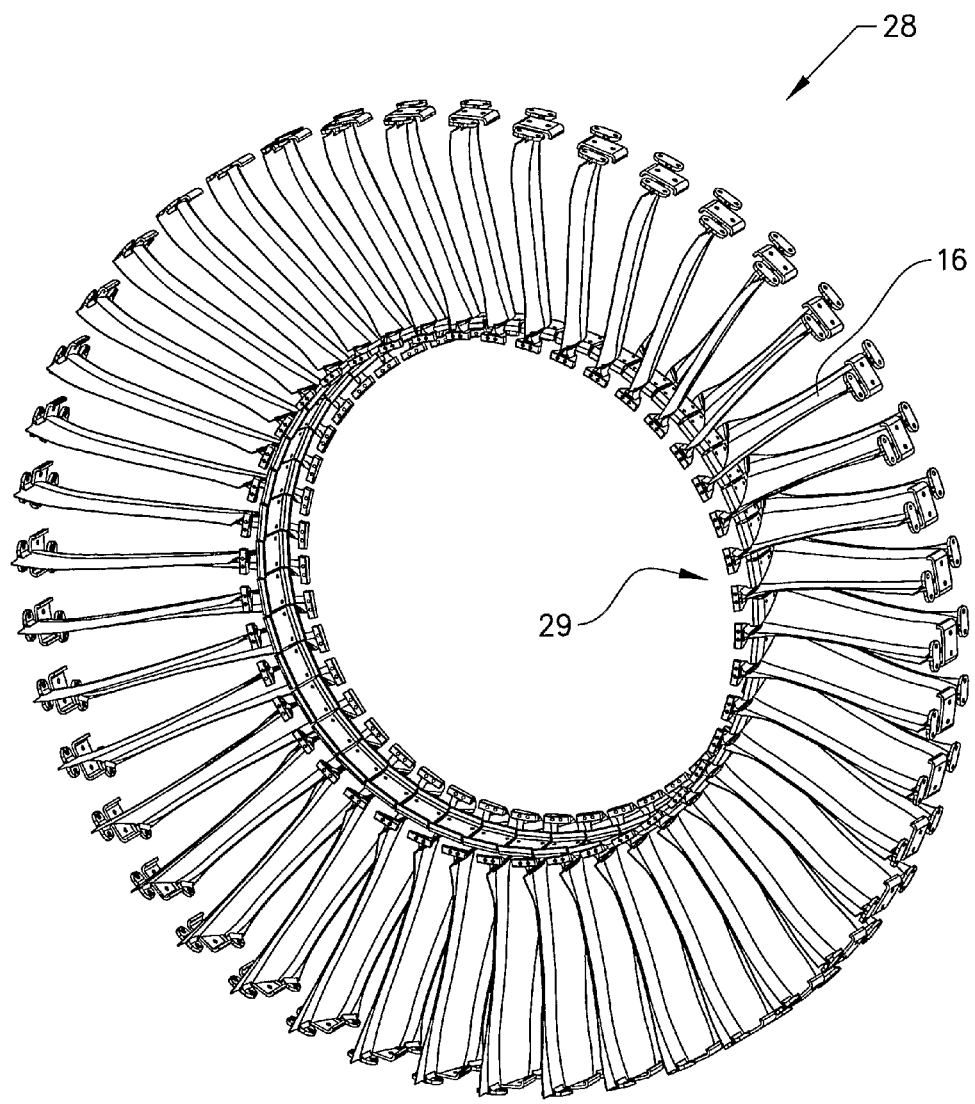

FIG. 5 shows a structure 28 of a plurality of said vanes 16 arranged in a circumferentially spaced manner. Fan gas flow channels are formed between the adjacent vanes 16. The structure 28 is designed to form part of the intermediate case 15 (see FIG. 1). The intermediate case 15 comprises an annular inner structure, or ring, 29, an annular outer structure, or ring (not shown) and the plurality of circumferentially spaced vanes arranged between the inner structure and the outer structure.

The invention is not in any way limited to the above described embodiments, instead a number of alternatives and modifications are possible without departing from the scope of the following claims.

The invention claimed is:

1. A stator component for a gas turbine engine, the component being adapted to be located upstream of a combustion chamber of the gas turbine engine, comprising
   an annular inner structure,
   an annular outer structure, and
   a plurality of circumferentially spaced vanes arranged between the inner structure and the outer structure, wherein gas flow channels are formed between the adjacent vanes, wherein at least one of the vanes is formed by a vane comprising
      a cast edge part for at least one of a leading edge part and a trailing edge part, wherein at least one of the leading edge part and the trailing edge part is cast in one piece in a light-weight material by a vacuum high pressure die casting method, and an attachment for attaching the vane to the outer structure upstream of the combustion chamber of the as turbine engine, in one piece with the cast edge part.

2. A stator component according to claim 1, wherein it forms an intermediate case for the gas turbine engine.

3. A gas turbine engine wherein it comprises a stator component according to claim 1.

4. A method for producing a vane for application in a component in a gas turbine engine, the component being adapted to be located upstream of a combustion chamber of the gas turbine engine, comprising
casting a cast edge part for at least one of a vane leading edge part and a vane trailing edge part in a light-weight metal material by a vacuum high pressure die casting method,
connecting the leading edge part and the trailing edge part, and
casting an attachment for attaching the vane to an external structure in one piece with the cast edge pan.

5. A method according to claim 4, comprising casting the cast edge part with such a shape that it extends along the complete longitudinal edge of the vane.

6. A method according to claim 4, comprising casting the cast edge part so that it is adapted to be load carrying in a longitudinal direction of the vane.

7. A method according to claim 4, comprising casting each of the leading edge part and the trailing edge part in one piece.

8. A method according to claim 4, comprising attaching the leading edge part and the trailing edge part on opposite sides of an intermediate vane part.

9. A method according to claim 6, comprising forming the intermediate vane part by arranging two plate-shaped portions at a distance from each other, which portions define opposite external surfaces of the vane.

10. A method according to claim 9, wherein each of the plate-shaped portions comprises a metal sheet.

11. A method according to claim 8, connecting at least one of the leading edge part and the trailing edge part to the intermediate vane part via welding.

12. A vane for application in a component in a gas turbine engine, the component being adapted to be located upstream of a combustion chamber of the gas turbine engine, comprising
a cast edge part for at least one of a leading edge part and a trailing edge part, wherein the at least one of the leading edge part and the trailing edge part is cast in one piece in a light-weight material by a vacuum high pressure die casting method, and
an attachment for attaching the vane to an external structure in one piece with the cast edge part.

13. A vane according to claim 12, wherein the cast edge part extends along the complete longitudinal edge of the vane.

14. A vane according to claim 12, wherein the cast edge part is adapted to be load carrying in the longitudinal direction of the vane.

15. A vane according to claim 12, wherein each of the leading edge par and the trailing edge part is in one piece.

16. A vane according to claim 12, wherein the vane comprises an intermediate vane part arranged between the leading edge part and the trailing edge part.

17. A vane according to claim 16, wherein the intermediate vane part comprises two plate-shaped portions arranged at a distance from each other, which define external surfaces of the vane.

18. A vane according to claim 17, wherein each of the plate-shaped portions comprises a metal sheet.

19. A vane according to claim 16, wherein at least one of the leading edge part and the trailing edge part is attached to the intermediate vane part via a weld connection.

* * * * *